United States Patent [19]

Murakoshi et al.

[11] Patent Number: 5,187,858
[45] Date of Patent: Feb. 23, 1993

[54] METHOD OF PRODUCING A STATOR FOR A ROTARY MACHINE

[75] Inventors: Toshiichi Murakoshi, Neyagawa; Hiroshi Kawazoe, Hirakata; Toshihiro Takahata, Minoo; Shigeki Nishimura, Tajimi; Yoshiyuki Haruta, Nagoya, all of Japan

[73] Assignees: Matsushita Electric Industrial Co., Ltd.; Matsushita Seiko Co., Ltd., both of Osaka, Japan

[21] Appl. No.: 772,635

[22] Filed: Oct. 8, 1991

Related U.S. Application Data

[63] Continuation of Ser. No. 536,857, Jun. 12, 1990, abandoned.

[30] Foreign Application Priority Data

Jun. 14, 1989 [JP] Japan ................................. 1-151859

[51] Int. Cl.⁵ ............................................. H02K 15/14
[52] U.S. Cl. .................................. 29/596; 242/1.1 E; 310/71
[58] Field of Search ............... 29/605, 609, 596, 598; 242/1.1 E, 1.1 R, 1.1 A; 310/71

[56] References Cited

U.S. PATENT DOCUMENTS

| | | | |
|---|---|---|---|
| 2,607,816 | 8/1952 | Ryder et al. | 29/596 X |
| 2,923,484 | 2/1960 | Roberts | 242/1.1 E |
| 4,280,275 | 7/1981 | Mitsui | 29/596 X |
| 4,724,604 | 2/1988 | Kawazoe et al. | 29/596 X |
| 4,964,210 | 10/1990 | Takagi | 29/596 |
| 5,029,379 | 7/1991 | Niemela et al. | 29/596 |

FOREIGN PATENT DOCUMENTS 58-33945 2/1983 Japan .

*Primary Examiner*—Carl E. Hall
*Attorney, Agent, or Firm*—Panitch, Schwarze, Jacobs & Nadel

[57] ABSTRACT

A stator for a rotary machine is produced by a method which includes the steps of: mounting terminal pins to one end of a main core unit which has teeth protruding from its outside; winding the beginning part of a coil wire around one of the terminal pins, and then winding the coil wire around a plurality of adjoining teeth to form a coil and repeating the formation of a coil until a predetermined number of coils are obtained on the outside of the main core unit, and thereafter winding the ending part of the coil wire around one of the other terminal pins; fitting a ring unit on the outside of the main core unit while these units are respectively kept in appropriate shapes by adjusting members; and inserting wedge members between the outside of the coils and protrusions formed on the outer ends of the teeth.

3 Claims, 5 Drawing Sheets

METHOD OF PRODUCING A STATOR FOR A ROTARY MACHINE

This application is a continuation of U.S. Ser. No. 536,857, filed Jun. 12, 1990, now abandoned.

BACKGROUND OF THE INVENTION

1. Field of the Invention:

The present invention relates to a method of producing a cylindrical stator which is used in a rotary machine such as an inner-rotor electric motor.

2. Description of the Prior Art:

Stators for use in the conventional inner-rotor electric motors have been produced by the so-called insert method. In this method, coils are first prepared by winding coil wires on a frame, and then the resultant coils are inserted into the slots between teeth formed on the inside of a cylindrical stator core, resulting in a stator.

In this insert method, the shape of each coil previously prepared must be adjusted before it is inserted into the slots through slits between the ends of the teeth. After insertion, the portions of the coils which protrude out from the upper and lower ends of the stator core are appropriately shaped and secured in place, and lead wires are prepared and attached to the ends of the coils. In this way, this method requires many processes for mounting the coils on the stator core, thereby complicating the production, reducing productivity and making it difficult to automate the production process of the stator.

Another type of stator core for a stator has been proposed by Japanese Laid-Open Patent Publication No. 58-33945. The stator core comprises a main core unit, on the outside of which a plurality of protruding teeth are formed, and a ring unit which fits on the outside of the main core unit. In the production of this stator core, a coil wire is repeatedly passed through the slots between the teeth to form coils on the outside of the main core unit by a flyer winding technique, etc.

In this method, the coil wire is directly formed on the outside of the main core unit, so that coils need not be inserted in the slots and the processes required before and after the insertion are not necessary. This simplifies the production process, but the complicated work for preparing the lead wires for the coils is still necessary, which makes it difficult to automate the production.

SUMMARY OF THE INVENTION

The method of producing a stator for a rotary machine according to the present invention, which overcomes the above-discussed and numerous other disadvantages and deficiencies of the prior art, comprises the steps of: mounting a plurality of terminal pins to one end of a main core unit which has teeth radially protruding from its outside; winding the beginning part of a coil wire around one of said terminal pins, and then winding said coil wire around a plurality of adjoining teeth to form a coil and repeating the formation of a coil until a predetermined number of coils are obtained on the outside of said main core unit, and thereafter winding the ending part of said coil wire around one of the other terminal pins; and fitting a ring unit on the outside of said main core unit.

The method of producing a stator of this invention further includes the step of inserting wedge members made of an insulating material between the outside of the coils and protrusions formed on the outer ends of the teeth, thereby closing the openings between the teeth.

In a preferred embodiment, each of the wedge members has a pair of stop tabs which interlock with the upper and lower ends of each of the teeth.

In a preferred embodiment, the ring unit is made of layered iron sheets, and the main core unit and the ring unit are respectively kept in appropriate shapes by adjusting members during the above-mentioned fitting step.

Thus, the invention described herein makes possible the objectives of:(1) providing a method of producing a stator for a rotary machine, in which coils can easily be formed on the main core unit; (2) providing a method of producing a stator for a rotary machine, which enables the automation of the production process thereof; (3) providing a method of producing a stator for a rotary machine, in which the beginning and ending parts of the coil wire are wound around the terminal pins, which makes it easier to fix the beginning and ending parts of the coils to the main core unit; (4) providing a method of producing a stator for a rotary machine, which does not require the complicated work for preparing lead wires for the coils; (5) providing a method of producing a stator for a rotary machine, in which the coils are securely held in place by the wedge members; and (6) providing a method of producing a stator for a rotary machine, in which the main core unit is pressed into the ring unit while they are kept in appropriate shapes by the respective adjusting members, so that these units can be fitted together smoothly.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
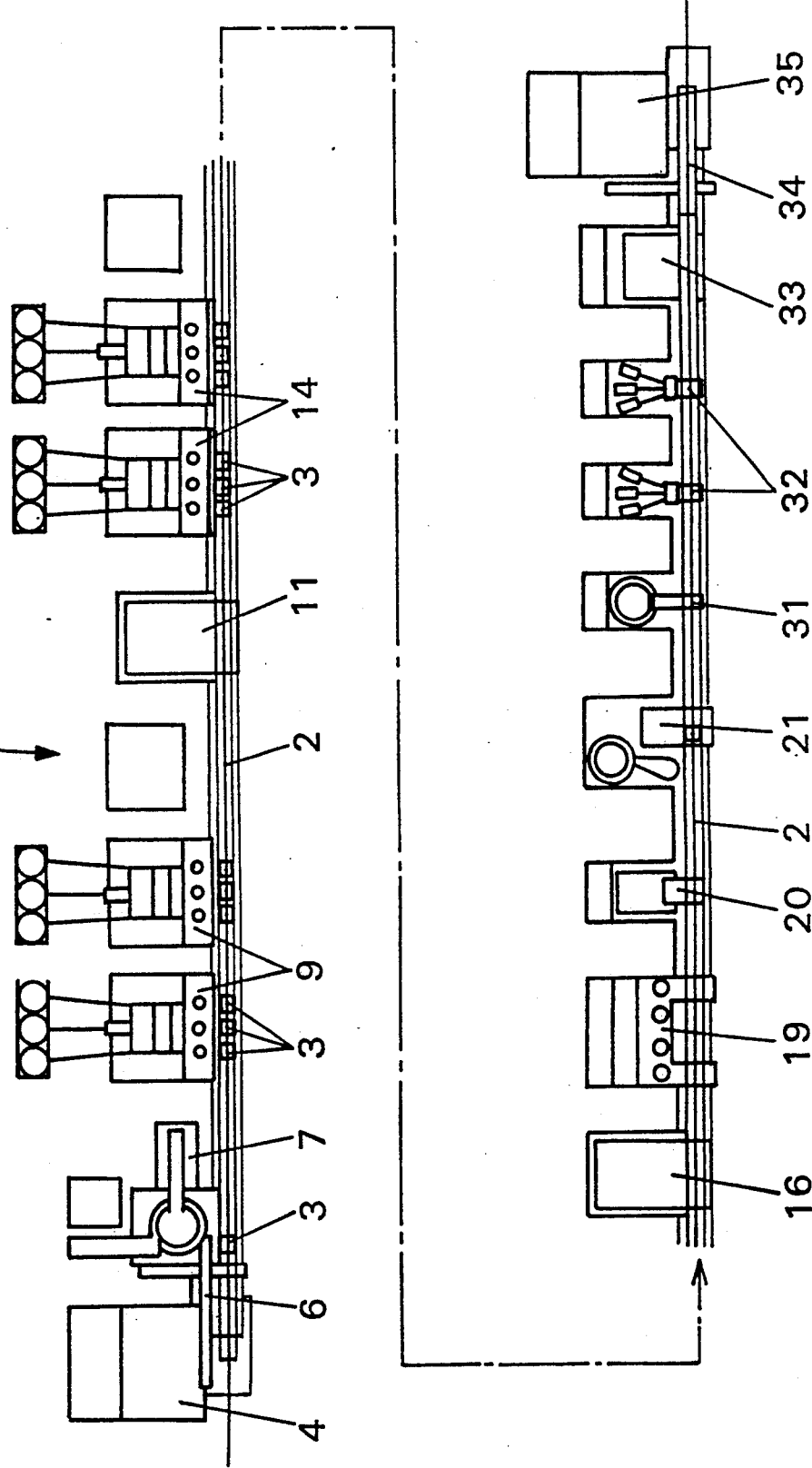
FIG. 1 is a schematic diagram showing a production line of a stator in accordance with a method of the invention.

FIG. 1 shows an automated production line 1 for producing a stator in accordance with a method of the invention. The production line 1 comprises a conveyer line 2 equipped with a plurality of support jigs 3 for holding stators in place. The support jigs 3 can be moved and positioned as desired in accordance with the procedure of the production. Along the conveyer line 2 are located a tray feeder 4, a robot 6, a terminal pin press-fitting machine 7, a pair of first winding machines 9, a first wedge insertion machine 11, a pair of second winding machines 14, a second wedge insertion machine 16, a soldering machine 19, a detector 20, a ring press-fitting machine 21, a terminal-mounting machine 31, a pair of soldering machines 32, and an inspection device 33, a robot 34, and a tray feeder 35, in that order. The following describes the production steps performed by these machines, in accordance with the procedure of the production.

The tray feeder 4 supplies trays containing a plurality of main core units 5, and the robot 6 takes the main core units 5 from the tray supplied from the tray feeder 4, and successively places them in the respective support jigs 3 of the conveyer line 2.

Figure 2:
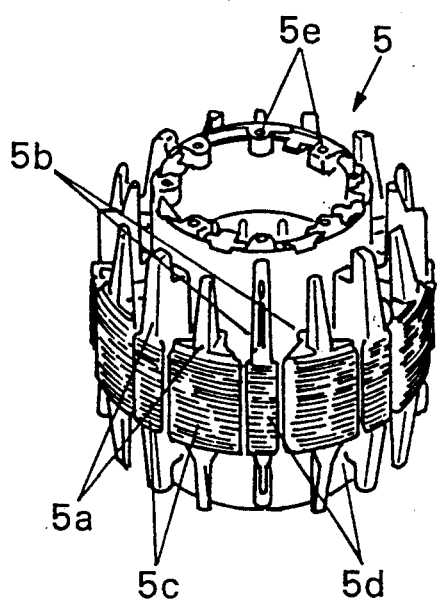
FIGS. 2 to 9 are perspective views of the stator in each production step of the method of the invention.
Figure 11:
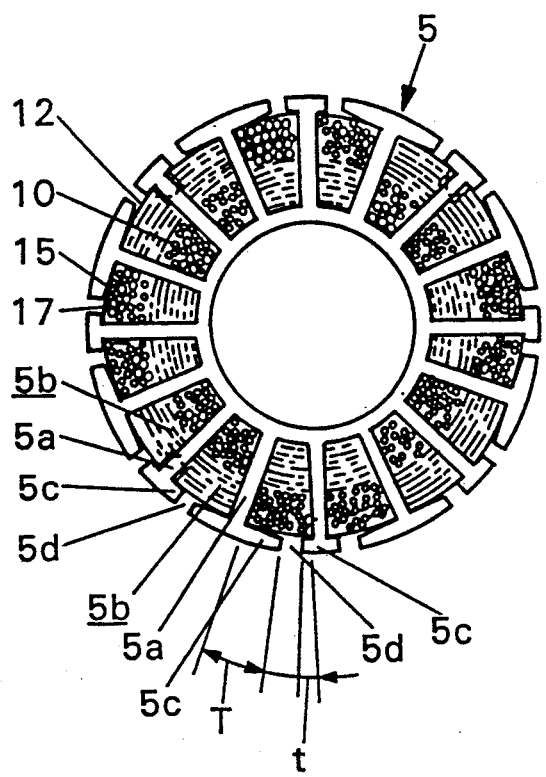
FIG. 11 is a plan view showing a main core unit of the stator around which coils are wound.

Referring to FIGS. 2 and 11, each of the main core units 5 has a predetermined number of teeth 5a (sixteen teeth 5a in this example) radially protruding from the outside thereof. Slots 5b are formed between the adjacent teeth 5a. Each of the teeth 5a is provided with a protrusion 5c at the outer end thereof, the protrusion 5c extending in the circumferential direction on either side as shown in FIG. 11. Between the adjacent protrusions 5c are formed slits 5d through which a coil wire is passed during winding. There are two kinds of protrusions 5c; one has a wide circumferential width T, and the other has a narrow circumferential width t, the two kinds of protrusions 5c being alternated on the outer ends of the teeth 5a. On one end of the main core unit 5, a plurality of pinholes 5e are formed in appropriate locations.

Figure 3:
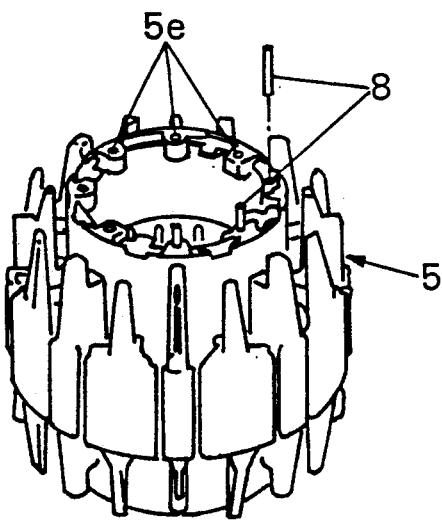

The main core unit 5 taken out by the robot 6 from the tray is transported by the conveyer line 2 to the terminal pin press-fitting machine 7, which cuts off hoop material to produce terminal pins 8 (first to third terminal pins in this example) and presses them respectively into the pinholes 5e of predetermined locations, as shown in FIG. 3.

Figure 4:
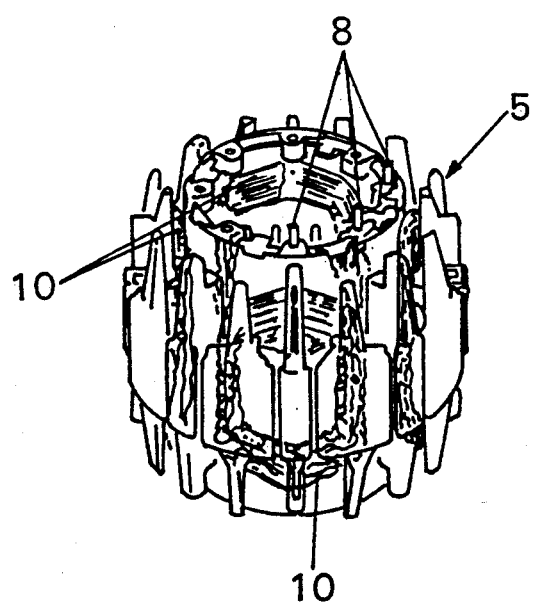
Figure 5:
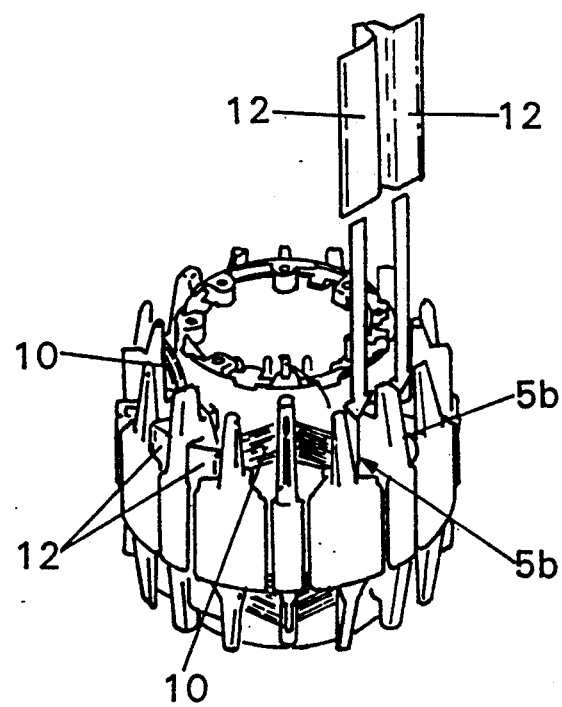

Then, the main core unit 5 on which the terminal pins 8 have been mounted is conveyed to the first pair of winding machines 9, which form inner coils 10 on the outside of the main core unit 5 as shown in FIGS. 4 and 11. For explanation convenience, the sixteen slots 5b are numbered from 1st to 16th in FIG. 11. In this winding step, first, the beginning part of the coil wire is wound around the first terminal pin 8. Then, the coil wire is repeatedly passed through the 1st slot 5b and the 4th slot 5b by a predetermined number of turns to form a coil around the 2nd and 3rd slots 5b, and then through the 5th slot 5b and the 8th slot 5b to form a coil around the 6th and 7th slots 5b. In this way, the full length of the coil wire is successively wound around the main core unit 5 until four inner coils 10 are formed on the outside thereof. The thus obtained inner coils 10 are located in the inner portions of the slots 5b and adjacent coils 10 are wound in opposite directions. After the four inner coils 10 have been formed, the ending part of the coil wire is wound around the second terminal pin 8.

Figure 12A:
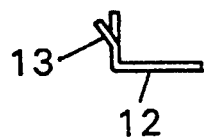
FIG. 12a is a plan view of an insulating wedge member.
Figure 12B:
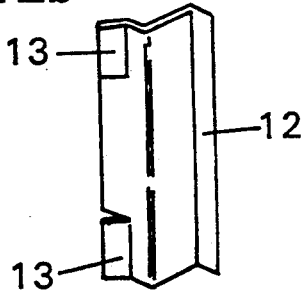
FIG. 12b is a perspective view of the wedge member.

The main core unit 5 is then transported into the first wedge insertion machine 11, which inserts a wedge member 12 made of an insulating material into each of the slots 5b in which the layers of the wire of the coils 10 are located. At this time, the wedge members 12 are disposed between the outside of the coils 10 and the protrusions 5c, thereby closing the openings between the teeth 5a and holding the coils 10 in place. As shown in FIGS. 12a and 12b, a pair of stop tabs 13 are formed in each of the wedge members 12 by making cuts in either end. The stop tabs 13 interlock with the upper and lower ends of the teeth 5a when the wedge members 12 are inserted. Thus, the wedge members 12 securely hold the coils 10 in place.

Figure 6:
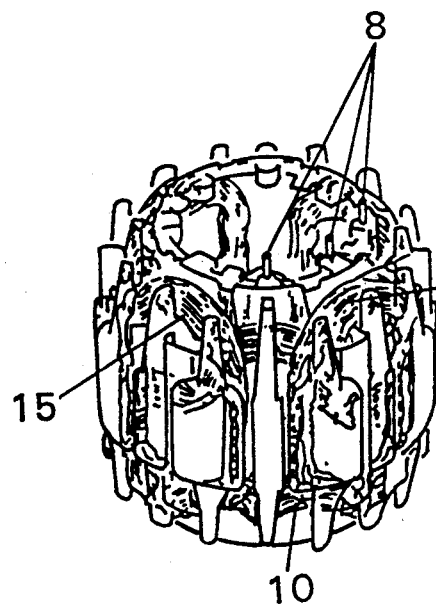

Thereafter, the main core unit 5 is delivered to the second pair of winding machines 14, which form outer coils 15 on the outer portions of the slots 5b as shown in FIGS. 6 and 11. In this winding step, first, the beginning part of the coil wire is wound around the second terminal pin 8 around which the ending part of the inner coils 10 has been wound. Then, the coil wire is repeatedly passed through the 3rd slot 5b and the 6th slot 5b by a predetermined number of turns to form a coil around the 4th and 5th slots 5b, and then through the 7th slot 5b and the 10th slot 5b to form a coil around the 8th and 9th slots 5b. In this way, the full length of the coil wire is successively wound around the main core unit 5 until four outer coils 15 are formed on the outside thereof. After the four coils 15 have been formed, the ending part of the coils 15 is wound around the third terminal pin 8. As shown in FIG. 11, the coils 10 and 15 are alternately arranged around the main core unit 5, and the coil wires of both the coils 10 and 15 are wound about the teeth 5a which have wider protrusions 5c of width T, so that the wires are prevented from coming off through the slits 5d, thereby raising the space factor.

Figure 7:
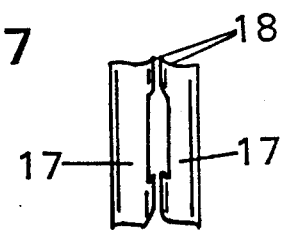
Figure 7:
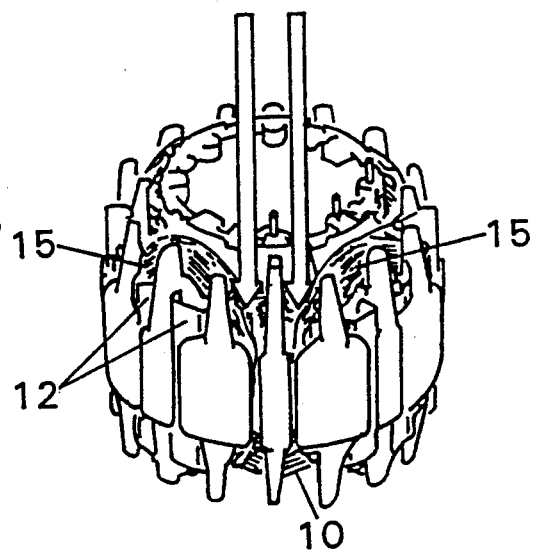
Figure 8:
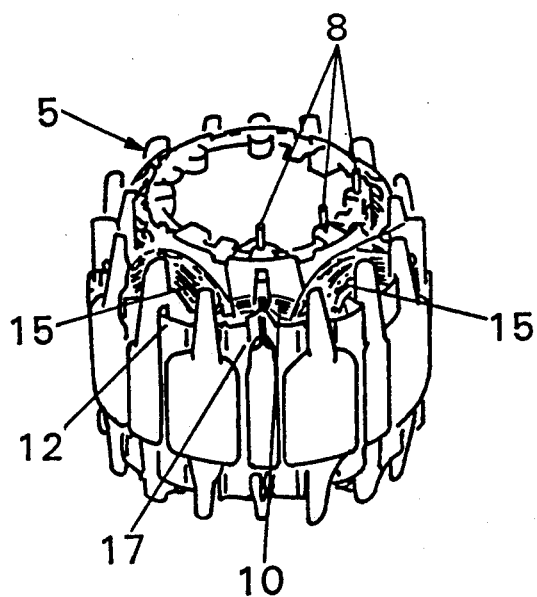

After the outer coils 15 have been formed, the main core unit 5 is conveyed to the second wedge insertion machine 16. By the second wedge insertion machine 16, as shown in FIG. 7, wedge members 17, which have stop tabs 18 as do the wedge members 12 and are also made of the same insulating material, are inserted into the slots 5b in which the layers of the wire of the coils 15 are disposed. Also at this time, the wedge members 17 are disposed between the coils 15 and the protrusions 5c, thereby closing the openings between the adjacent teeth 5a and securely holding the coils 15 in place.

Thereafter, the main core unit 5 is conveyed to the soldering machine 19, which solders the beginning and ending parts of the coils 10 and 15 to the terminal pins 8 around which they are wound. In this soldering step, the soldering machine 19 takes out the main core unit 5 from the support jig 3, applies flux to it while transporting it, solders the beginning and ending parts of the coils 10 and 15 to the terminal pins 8 by means of a dipping technique, and then returns the main core unit 5 to the support jig 3.

Thereafter, the detector 20 checks for continuity between the terminal pins 8 and the coils 10 and 15.

Figure 9:
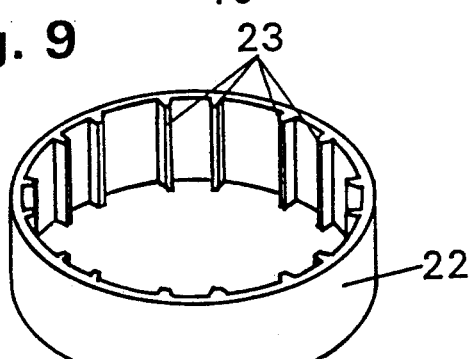
Figure 9:
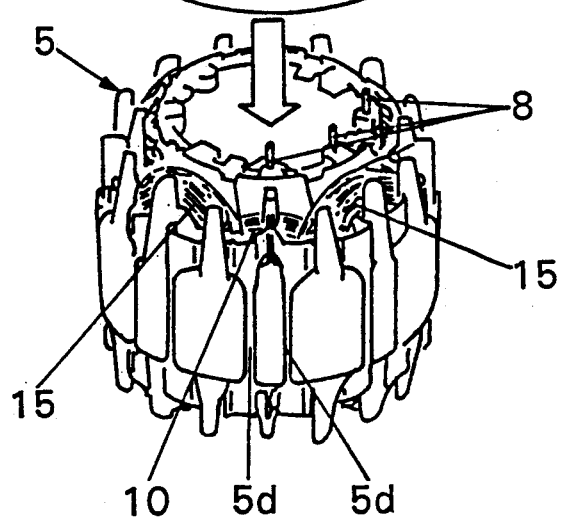
Figure 10:
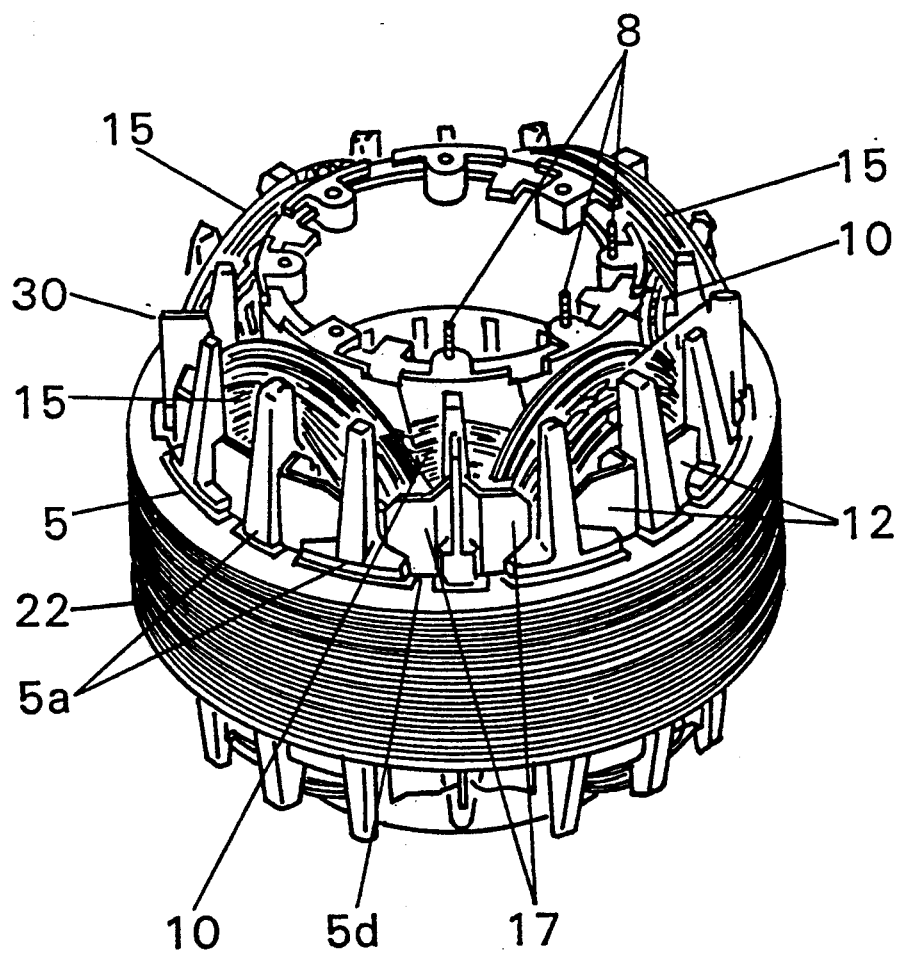
FIG. 10 is a perspective view of the stator completed by the method of the invention.
Figure 13:
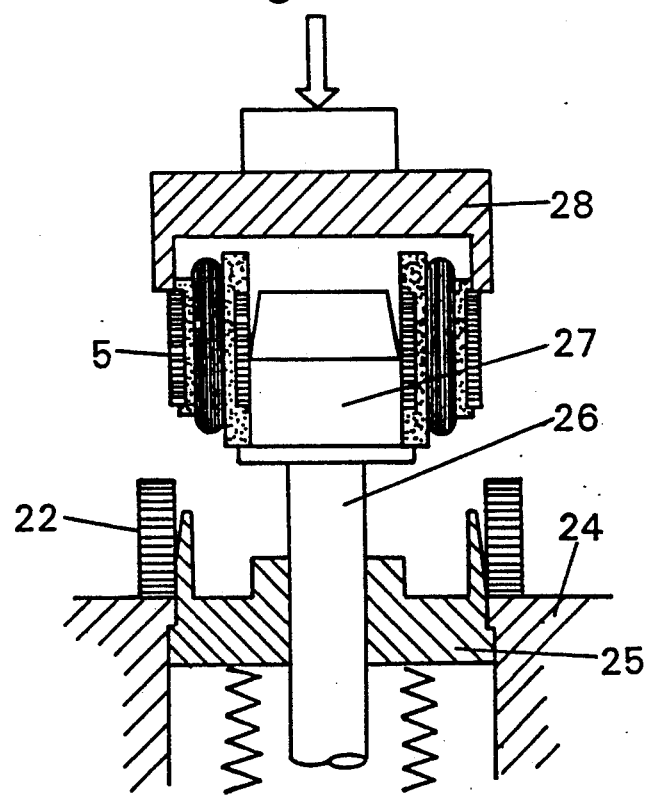
FIG. 13 is a schematic sectional view of a ring press-fitting machine for pressing the main core unit into a ring unit.

The main core unit 5 is then delivered to the ring press-fitting machine 21, by which a ring unit 22 made of layered iron sheets is fitted on the outside of the main core unit 5 as shown in FIG. 9. The inner surface of the ring unit 22 is provided with ribs 23 which fit into the slits 5d of the main core unit 5. In the ring press-fitting machine 21, as shown in FIG. 13, the ring unit 22 is supported on a supporting table 24 while being engaged with the outside of a ring adjusting member 25. The ring adjusting member 25 accurately regulates the shape of the ring unit 22, and can be raised into and retracted from the support table 24. The main core unit 5, on the other hand, is fitted on the outside of a main core adjusting member 27 disposed on the top of a shaft 26, which passes through the center of the ring adjusting member 25 and is capable of moving upward and downward. The shape of the main core unit 5 is accurately adjusted by the main core adjusting member 27. The outer surface of the main core unit 5 is engaged with an inserting member 28. The inserting member 28 is pushed down by a cylinder device (not shown), so that the main core unit 5 is pressed into the ring unit 22, resulting in a stator 30 as shown in FIG. 10. Since the main core unit 5 and the ring unit 22, which are susceptible to deformation due to their thinness, are kept in appropriate shapes by the respective adjusting members 27 and 25 during the insertion, they are smoothly fitted together.

Next, in the terminal-mounting machine 31, terminals for connecting wiring to the terminal pins 8 are placed on the terminal pins 8, and thereafter the terminal pins 8 and the connecting ends of the terminals are soldered together by the pair of soldering machines 32.

The stator 30 is then transported to the inspection device 33, which tests the stator 30 for withstand voltage, layer insulation, electrical resistance, etc., thereby completing the production of the stator 30.

Finally, the robot 34 takes out the completed stator 30 from the conveyer line 2 and sends it to the tray feeder 35 for removal.

As mentioned above, in the method of producing a stator in accordance with this invention, the terminal pins are attached to one end of the main core unit and the beginning and ending parts of the coils are wound around them, so that the beginning and ending parts of the coils can be easily fixed to the main core unit. Moreover, by connecting terminals for current supply to these terminal pins, the preparation of lead wires for the coils, which was time consuming and prevented the automation of the production in the prior art, can be eliminated. Thus, the efficiency of the production process is increased and the production can be easily automated.

Furthermore, since the wedge members are inserted between the coils and the protrusions of the teeth, the coils are held in place. As described above, the wedge members are provided with the stop tabs which interlock with the upper and lower ends of the teeth, so that the coils can be securely held in place only by the insertion of the wedge members.

Also as described above, the main core unit and the ring unit are kept in appropriate shapes by the respective adjusting members while being fitted together, so that these units, which are easily deformed due to their thinness, can be smoothly fitted together. Thus, this fitting process can be easily automated.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of producing a stator for a rotary machine, comprising the steps of:
   mounting a plurality of terminal pins to one end of a main core unit which has teeth radially protruding from its outside;
   winding the beginning part of a coil wire around a single one of said terminal pins, and then winding said coil wire around a plurality of adjoining teeth to form a coil and repeating the steps for formation of a coil until a predetermined number of additional coils are obtained on the outside of said main core unit, and thereafter winding the ending part of said coil wire around a single one of the other terminal pins;
   inserting wedge members made of an insulating material between an outside portion of said coils and protrusions formed on outer ends of said teeth, thereby closing openings between the teeth; and
   fitting a ring unit on the outside of said main core unit.

2. A method according to claim 1, wherein each of said wedge members has a pair of stop tabs which interlock with the upper and lower ends of each of said teeth.

3. A method according to claim 1, wherein said ring unit is made of layered iron sheets, and said main core unit and said ring unit are respectively kept in appropriate shapes by adjusting members during said fitting step.

* * * * *